April 10, 1945. W. O. BAKER 2,373,093
PROCESS FOR INHIBITING CRACKING OF POLYMERIC BODIES
Filed April 22, 1943
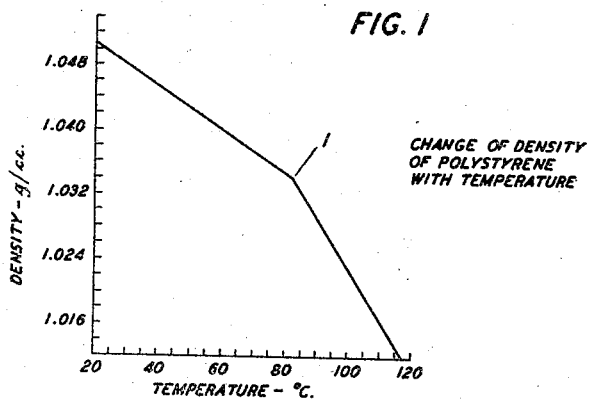
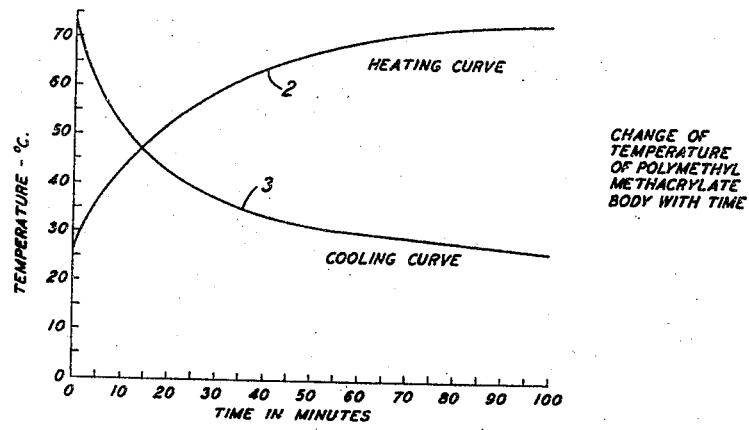
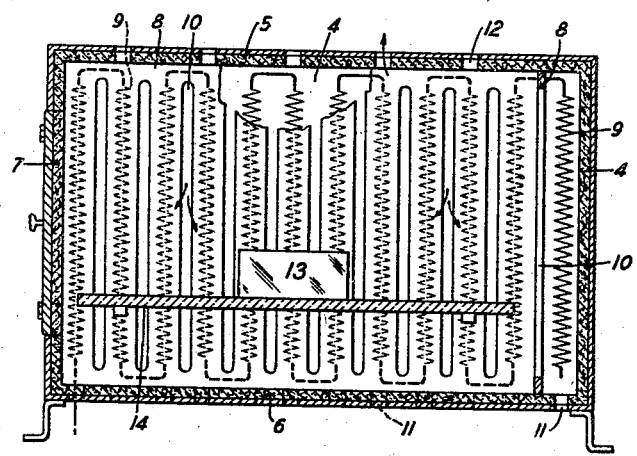
INVENTOR
W. O. BAKER
BY
J. W. Schmied
ATTORNEY Patented Apr. 10, 1945

2,373,093

UNITED STATES PATENT OFFICE 2,373,093

PROCESS FOR INHIBITING CRACKING OF POLYMERIC BODIES

William O. Baker, Morristown, N. J., assignor to Bell Telephone Laboratories, Incorporated, New York, N. Y., a corporation of New York Application April 22, 1943, Serial No. 483,998

18 Claims. (Cl. 18—48)

This invention relates to the treatment of organic thermoplastic polymers and more particularly to the treatment of hard, essentially amorphous, glassy, thermoplastic organic polymers to improve their resistance to cracking and other of their properties.

Many hard, essentially amorphous, glassy, thermoplastic organic polymers, such as polymethyl methacrylate and polystyrene, when formed into bodies and particularly when formed by molding procedures into bodies of large cross-sections, or large and irregular shapes, display a very troublesome tendency to crack when subjected to conditions encountered in use. In its lesser aspects this tendency is manifested by shallow cracking on the surface of such a body, usually termed "crazing" or "frosting." In its more serious aspects this tendency is manifested by deep cracking or even complete breakage of such a body. Cracking usually occurs on mere aging of the body at ordinary temperatures. However, it is often initiated sooner or intensified when the body is subjected to relatively slight impacts, or is exposed to low temperatures, or is machined, or is exposed to certain organic agents having a solvating action on the body which are often employed in lacquers or coatings applied to the surfaces of such bodies for various purposes, or is exposed to other conditions.

It has been found that the tendency of such a body to crack is due to the presence of stored mechanical stresses in the body. In general, the presence of such stored stresses in the body is made possible by the long relaxation time of the polymer of which the body is formed. Such stored stresses may be of various kinds and be induced by various conditions. Stored mechanical stresses which apparently are the most harmful in causing cracking are developed in the body when the body is formed by molding of the polymer to a desired shape while it is in the plastic state due to heat, and is then fairly rapidly cooled as in common in most molding procedures. Portions of the polymer are stressed during the molding operation and such stresses are frozen in the body on cooling.

Other crack-inducing stored stresses are developed in the body by uneven shrinkage during initial cooling of the polymer. Thus as the formed body cools from the plastic state its outer surfaces first cool and form a rigid shell within which the molten interior cools and attempts to contract. The cooling and attempted contraction of the interior material cause high stresses extending from the interior of the body to its exterior surfaces.

Another type of stored stress which causes a tendency to crack arises because molecules of the polymer as it solidifies tend to take up a preferred average packing even though they do not crystallize. This molecular packing tends to shift with the volume shrinkage of the polymer; however, the uneven cooling and shrinkage described above cause the volume and molecular order changes to be out of equilibrium in the cooled solid body. This lack of equilibrium induces in the body stored mechanical stresses which tend to cause cracking. Stored mechanical stresses which tend to cause cracking are also developed for other reasons.

Cracking of the body is due to the release of the stored mechanical stresses. As is indicated above, this release may occur spontaneously upon the mere passage of time, but may also be initiated or accelerated by other conditions such as impacts, exposure of the body to low temperatures, machining of the body, exposure of the body to certain agents having a solvating on the polymer, etc.

Tendencies of certain hard, essentially amorphous, glassy, thermoplastic, organic polymeric bodies to crack and the difficulties arising therefrom have long been known, and many attempts have been made to overcome such cracking tendencies. Thus, it has been proposed to heat-treat the bodies by heating the bodies in various liquids, but in general such treatments involve highly critical treating conditions and do not inhibit cracking as fully as might be desired. It has also been proposed to heat bodies in air, but such treatments involve heating the bodies above their softening points with resultant deformation of the bodies.

The present invention provides a simple, rapid, non-critical annealing process which is highly effective in releasing internal stored mechanical stresses in bodies of hard, essentially amorphous, glassy, thermoplastic organic polymers and in greatly reducing, if not entirely eliminating, tendencies of such bodies to crack, and which does not deform such bodies. The process of the invention will be more fully described hereinafter in connection with the accompanying drawing, in which:

Fig. 1 represents a curve illustrating the transition temperature of polystyrene;

Fig. 2 represents a heating and a cooling curve for a body treated according to the present invention; and Fig. 3 represents diagrammatically an oven in which a body may be heated according to the present invention.

According to the present invention, a body formed of a hard, essentially amorphous, glassy, thermoplastic, organic polymer, which body contains stored mechanical stresses which tend to crack the body, is slowly heated to a temperature below but in the vicinity of the transition temperature of the polymer substantially entirely by transfer of heat from a surrounding gas heated to a temperature not higher than about 10° C. above said transition temperature of the polymer for a time sufficient to relieve the internal stored stresses which tend to cause cracking of the body, after which said heated body is slowly cooled to room temperature substantially entirely by transfer of heat from the body to a surrounding gas.

The bodies of organic polymers, to the treatment of which the present invention pertains, are essentially amorphous in that they contain no more than a small minor proportion of crystalline phase. They are hard and glassy in the sense that they have a hardness and a tendency toward brittleness similar to those of vitreous materials, whereby the polymers are capable of possessing in the unannealed state stored mechanical stresses of sufficient magnitude to tend to crack the polymer bodies. In general, said polymers have a relatively high modulus of elasticity for essentially amorphous organic materials, of the order of about $10^7$ dynes per square centimeter or more. Such organic polymers are thermoplastic in the sense that they are permanently capable of being put into a plastic state by being heated to sufficiently elevated temperatures.

Plasticizers in the polymers tend to render them less brittle, to reduce their modulus of elasticity, and to decrease the possibility of the presence of stored mechanical stresses capable of causing cracking. Hence the treatment of the present invention when applied to bodies of highly plasticized organic polymers is substantially less advantageous than when applied to the treatment of bodies of hard, essentially amorphous, glassy, thermoplastic, organic polymers of the kind described above which contain no plasticizer or not more than about 10 per cent by weight of the polymer.

While the invention is applicable to the treatment of various kinds of organic polymers of the above characteristics, including those of natural origin, the treatment of the invention provides particular advantages when applied to bodies of synthetic resins of the above-indicated characteristics. This arises out of the fact that synthetic resins in general have much longer relaxation times than do many natural polymers, and hence are much more capable of containing stored stresses tending to cause cracking.

Examples of hard, essentially amorphous, glassy thermoplastic organic synthetic resins containing no more than about 10 per cent by weight of plasticizer, bodies of which resins having a tendency to crack may be advantageously treated according to the present invention are: hard glassy polymerized methacrylates such as polymethyl methacrylate; hard glassy polymerized acrylates such as polymethyl acrylate; hard glassy copolymers of methacrylates and acrylates such as copolymers of methyl methacrylate and methyl acrylate; hard glassy polymerized vinyl alcohols such as polyvinyl alcohol; hard glassy polymerized vinyl halides such as polyvinyl chloride; hard glassy polymerized vinyl esters such as polyvinyl acetate; hard glassy vinyl copolymers such as certain copolymers of vinyl chloride and vinyl acetate; and hard, glassy polyesters and copolyesters formed by reaction of phthalic acid or its derivatives with one or more glycols such as ethylene glycol, propylene glycol, and the like. Other synthetic resins possessing the above indicated characteristics may be treated according to the invention.

The bodies of such organic polymers to the treatment of which the invention pertains may be of various shapes and sizes ranging from bodies of thin cross-sections such as sheets to bodies of thick cross-sections. The present invention is particularly advantageous when applied to the treatment of bodies of large cross-sections since such bodies usually contain more stored stresses tending to cause cracking than do bodies of thinner cross-sections. The bodies to the treatment of which the present invention pertains are formed by molding a normally solid organic polymer while it is plastic as because it is at a temperature above its softening temperature. The bodies may be molded by injection or compression molding techniques, by drawing or pressing operations, by extrusion operations, by rolling operations, or by other molding techniques. The process of the present invention offers exceptional advantages when applied to the treatment of molded bodies since the molding operation usually causes the development in the bodies of stored stresses capable of causing cracking, whereas other forming processes, such as casting processes involving polymerizing the polymer in situ, in general do not cause such stresses to develop.

The bodies which may be advantageously treated according to the invention contain stored stresses tending to cause cracking which are of the nature of the stored stresses discussed above, and which will cause crazing or frosting of the surface of the body or deeper cracking of the body upon mere aging of the body, upon relatively slight impact, upon cooling to low temperatures, upon machining, or upon exposure of the body to certain organic agents having a solvating action on the polymer, such as kerosene, ethanol or methanol.

The transition temperature below which but in the vicinity of which the bodies are heated according to the present invention is known in the art to be the temperature at which fundamental structural changes occur in the polymer. Said transition temperature is the temperature at which appreciable softening of the polymer occurs, and at which the thermal coefficient of density change, or the thermal coefficient of volumetric expansion, changes upon heating. In other words, at said transition temperature the density-temperature curve, or the volumetric expansion-temperature curve, changes slope. This is illustrated for pure polystyrene by Fig. 1 of the drawing in which the point 1, at the intersection of the two straight lines indicating the different coefficients of density change with temperature, is the transition temperature. In some cases a polymer, a body of which may be treated according to the present invention, may have more than one apparent transition temperature, or may have a transition temperature not clearly defined by a curve of this type; in such case the transition temperature below which the body is heated according to the invention is the temperature at which appreciable softening of the polymer occurs.

A simple test for closely determining the transition temperature below which the body of polymer should be heated according to the invention is as follows: the transition temperature is that temperature at which a body of the polymer, in the shape of a right cylinder of a height equal to its diameter which is about .35 inch and standing on end, begins to flow but does not decrease in height due to such flow by more than 4 per cent of its original height when the body is subjected to a pressure of about 330 pounds per square inch and is in a state of temperature equilibrium throughout the body.

In the process of treatment according to the invention, a body of organic polymer which is to be treated to relieve internal stresses causing a tendency to crack is advantageously heated to a temperature between about 5° C. and about 20° C. below such transition temperature. The heating is carried out under such conditions that the body is heated substantially entirely by transfer of heat to the body from a surrounding gas which is at a temperature advantageously below the transition temperature of the polymer of which the body is formed but in any event is not greater than about 10° C. above such transition temperature. A higher gas temperature is undesirable since it would tend to cause too rapid heating of the body or heating of the body sufficiently above the transition temperature to cause deformation. The body is then slowly cooled substantially entirely by conduction of heat from the body to a surrounding gas.

In the process of the invention the heat capacity of the body is so high in comparison to the specific heat capacity of the heating gas that, when the body is substantially entirely heated by transfer of heat to the body from the heated gas, the heating of the body, even when the gas is at a temperature above the transition temperature by the indicated amount, is slow, smooth and free of severe thermal shock to the body. For similar reasons the cooling of the body is slow, uniform and free of thermal shock to the body. Such slow, smooth heating of the body throughout a substantial portion of its mass permits molecular reordering and stress release, surprisingly even though the transition temperature of the polymer is not reached. The slow, smooth cooling of the body prevents the restoration of the conditions causing stresses. Thus the stored stresses tending to cause cracking are largely, if not entirely, removed by the process of the invention. Since the body is heated below the transition or softening temperature of the polymer of which the body is formed no deformation or change in shape of the body results.

Any gas which has no harmful effect on the body at the elevated temperatures employed may be used for heating the body, since all such gases have a low heat capacity as compared with the polymer being heated. For example, gases such as air, nitrogen, carbon dioxide and other inert gases may be employed. It is most advantageous to employ air as the heating gas and as the cooling gas since its use involves fewer complications.

In the practice of the process of the invention, the body may be placed in gas heated to the maximum temperature it is desired to employ and be permitted to remain in the heated gas until it is heated to the desired extent; or the body may be more gradually heated by bringing the gas up to the desired temperature while the body is surrounded by the gas, as would occur if the body were heated together with the gas in an oven. Similarly the heated body may be cooled by being placed in a gas at room temperature; or the body may be more gradually cooled by being cooled by a gas which itself is cooled from an elevated temperature to room temperature, as would result if the body were cooled in an oven.

As a practical matter, it is most advantageous from the standpoint of rapid treatment to heat the body by placing it in a gas which is at the desired temperature and keeping it there for the time required to achieve sufficient heating of the body, and to cool the body by removing it from the heated gas into a gas at room temperature. Because of the gradual heating and cooling due to the difference in heat capacities of the body and surrounding gas in each case, the rates of heating and cooling are sufficiently slow in such a process to provide the desired stress-relieving effect.

Therefore, according to the invention, the body is heated to a temperature below but in the vicinity of its transition temperature substantially entirely by transfer of heat to the body from a heated gas at a rate at least as slow as that caused by transfer of heat to the body from a gas at a temperature no greater than about 10 degrees above the transition temperature of the body, and is cooled to room temperature substantially entirely by transfer of heat from said body to a gas at a rate at least as slow as that obtained by cooling in a gas at room temperature.

The time during which the body is heated is largely dependent upon the particular polymer of which the body is formed, and the size and shape of the body being heated, however, the time of heating is dependent to some extent upon the thickness of the largest cross-section of the body. The body should be heated for a period sufficient to heat the body to a substantial depth sufficient to reduce its tendency to crack; most advantageously the body is heated for a period at least as long as that required to heat the body to a state of equilibrium throughout its mass. Longer periods of heating are not harmful. Roughly, when the body is heated by being placed in a surrounding gas at the maximum heating temperature, it is advantageous to expose the body to the gas for at least one hour for each one-eighth inch of maximum cross-sectional thickness.

In general, bodies of the kind to which the invention pertains and which are formed of polymers having a transition temperature of about 80° C., as have most of the polymers indicated above as examples, may be heated according to the invention to a temperature from 5° C. to 20° C. below the transition temperature by a heated gas at a temperature less than 10° C. above the transition temperature for from one to seventy-two hours, depending upon the size and shape of the body. The optimum heating time can be easily found by test.

Fig. 2 is illustrative of the rates at which a body heats and cools when treated according to the present invention. In obtaining the data for the curves of this figure, a body of molded polymethyl methacrylate approximately one inch into the mid-point of the body. The body was heated in an air oven in which the air was maintained at a temperature of about 75° C. and which was of such a design that the body was substantially entirely heated by transfer of heat from the air to the body. Curve 2 of Fig. 2 illustrates the smooth gradual increase in temperature of the body upon heating. The body was then cooled by being removed from the oven and cooled substantially entirely by transfer of heat from the body to surrounding air which was at room temperature. Curve 3 shows the smooth gradual decrease in temperature which occurs on cooling in the process of the invention.

In heating a body according to the present invention, precautions should be taken to insure that the body is heated substantially entirely by transfer of heat from the heated gas to the body, and that little or no heating of the body occur because of conduction or radiation of heat to the body. If the body is heated in an oven, it is advantageous if the body is shielded from radiation from the source of heat, and if the body is supported so that little or no conduction of heat by the supporting means can occur. To prevent or reduce conduction of heat by the supporting means for the body it is desirable that the body be supported by a member which is at the same initial temperature as the body and which is formed of a material having about the same heat conductivity and heat capacity as the body. A support formed of glass is, in general, satisfactory. The volume of the oven should be such that the heat capacity of the body or bodies being heated do not exceed the heat capacity of the gas content of the oven. Local overheating in the oven should be avoided to prevent overheating of the body; for this reason it is advantageous to circulate generally the gas in the oven either by convection or by suitable blowing means.

On cooling the body precautions similar to those indicated should be taken in supporting the body to insure that substantially all cooling occurs due to transfer of heat from the body to the surrounding gas.

Fig. 3 diagrammatically shows a form of oven which may be employed in the practice of the invention. Said oven is an air oven comprising side walls 4, top wall 5 and bottom wall 6, and door 7, all comprising suitable heat insulation material to reduce losses. Each of the side walls 4 has mounted adjacent thereto and spaced therefrom an inner side wall 8 formed of some material having a low heat radiation coefficient. Electrical resistance heating elements 9 are disposed between the side walls 4 and the inner side walls 8 to provide a source of heat. Slots 10 are provided in the inner side walls 8, being located between the heating elements 9 to reduce radiation of heat from the heating elements to the body being heated. Air supply ports 11 are provided in the bottom wall 6 of the oven betwen the slots 10, and air discharge ports 12 are provided in the top wall 5 of the oven. In operation of the oven, air enters the ports 11, either because of convection or by being forced through said ports by suitable blower means, and passes over the heating elements 9 where it is heated. The heated air passes through the slots 10 into the interior of the oven and out through the discharge ports 12.

The body 13 which is to be heated is supported on a removable plate 14 which may be formed of glass or other material having heat conductivity and heat capacity characteristics approximating those of the body. The body 13 and the supporting plate 14 are at about the same temperature at the beginning of the heating operation. The illustrated oven heats the body 13 substantially entirely by transfer of heat from the heated air to the body, since the supporting plate 14 substantially prevents conduction of heat to the body and the inner walls 8 substantially prevent radiation of heat to the body. The body is kept in the oven for a predetermined period long enough to heat the body sufficiently to relieve stresses tending to cause cracking. At the end of this period the body is removed from the oven and is supported in a manner such that it cools substantially entirely by transfer of heat from the body to the surrounding air. Advantageously the body may be removed from the oven with its supporting plate 14 and cooled thereon.

Various other types of heating means, of course, may be employed in the practice of the present invention.

The following examples illustrate processes embodying the invention, and improvements attained by such processes in properties of a polymeric bodies.

*Example 1*

A molded body of intricate shape and of a maximum cross-sectional thickness of about one inch, which body was formed of a hard glassy polymethyl methacrylate sold commercially under the name "Lucite," as received from the molder, was tested for its tendency to crack by being dipped for one minute in ethanol at 25° C. Extensive crazing developed over the surface of the body almost immediately. The cracks became substantially deeper after the body stood in air for 24 hours. This test is an accelerated cracking test, since ethanol and other organic solvents having a solvating action on the polymer have been found to accelerate the cracking of bodies of the kind to which the invention pertains containing stored stresses sufficient to cause cracking over a period of time.

The transition point of the polymer of which the body was formed was determined by testing a sample of the polymer according to the pressure-temperature test described above and was found to be very nearly 80° C.

A molded polymethyl methacrylate body identical with and from the same batch as the molded body described above and unquestionably having the same cracking tendencies was placed in an air oven of the same general type as that described above in which air was maintained at a temperature of about 75° C. The body was heated in said oven substantially entirely by transfer of heat from air to the body for about one hour. The body was then removed from the oven and cooled in air at a temperature of about 25° C. substantially entirely by transfer of heat from the body to the air, until the body was at room temperature. The body was then immersed in ethanol for one minute and no crazing or cracking appeared after 24 hours. Even after the body was immersed in ethanol for 10 minutes no crazing or cracking appeared although such treatment would have caused complete cracking of the unannealed body.

The annealed body had considerably more resistance to cracking and chipping upon impact than the unannealed body. It also withstood several cycles of cooling to −75° C. and heating to room temperature without cracking, temperature cycles which caused extensive cracking in the unannealed body.

*Example 2*

An unannealed molded body identical with that treated in Example 1 was heated in a manner similar to that described in Example 1, except that the air in the oven was maintained at a temperature of 67° C. and the body was heated for 1½ hours. The resistance to cracking upon immersion in ethanol, resistance to cracking upon impact, and resistance to low temperatures were improved to an extent comparable to those of the annealed body of Example 1.

*Example 3*

An unannealed molded body identical with that treated in Example 1 was heated in a manner similar to that described in Example 1, except that the air in the oven was maintained at a temperature of 60° C. and the body was heated for 3 hours. The resistance to cracking upon immersion in ethanol, resistance to cracking upon impact, and resistance to low temperatures were improved to an extent comparable to those of the annealed body of Example 1.

*Example 4*

Several identical disks each about 1¾ inch in diameter and ¼ inch thick were cut from an unannealed molded rod of polystyrene and five ⅛ inch diameter holes were drilled therethrough. One of the disks was dipped into kerosene for one minute and after removing therefrom extensive cracking developed about the holes in the disk and at the edges within a period of a few hours.

The transition temperature of the polystyrene of which the disks were formed was found by the above described pressure-temperature test to be in the neighborhood of 82° C.

Another of said disks of polystyrene was heated in a manner similar to that followed in Example 1 in an air oven in which the air was at a temperature of about 75° C., the disk being kept in the oven for about 2 hours. After the heating, the disk was cooled slowly in air at room temperature substantially entirely by transfer of heat from the disk to the air. The disk was dipped in kerosene for one minute and even after standing for 24 hours with a film of kerosene thereon did not crack. The resistance of the disk to cracking and chipping upon impact, and the resistance to cracking upon cooling to a low temperature were also greatly improved.

*Example 5*

A disk identical with that employed in Example 4 was heat treated in a manner similar to that followed in Example 1 except that the air in the oven was maintained at a temperature of 75° C. and the disk was heated for 20 hours, after which it was cooled in air at room temperature substantially entirely by transfer of heat from the disk to the air. The annealed disk developed no cracking or crazing after standing in contact with kerosene for 24 hours, and its resistance to cracking and chipping upon impact and cooling to low temperatures were improved to a degree comparable to that of the annealed disk of Example 4.

*Example 6*

A solid cylinder 1¾ inches in diameter and 12 inches long of molded polystyrene was subjected to an accelerated cracking test by being immersed in kerosene, and after 4 hours was found to show serious cracking along its middle surface and deep cracks extending from the two ends. An identical cylinder of polystyrene was heated according to the procedure employed in Example 1 for 40 hours in an air oven in which the air was maintained at a temperature of about 75° C., after which the cylinder was slowly cooled substantially entirely by transfer of heat from the cylinder to air at room temperature. The annealed cylinder showed no cracking or crazing effects whatsoever when exposed to kerosene for 4 hours.

The present invention provides a simple non-critical annealing treatment for bodies of hard, glassy, essentially amorphous, thermoplastic organic polymers containing stored stresses which tend to cause cracking of the body upon aging, impact, machining, exposure to various agents having a solvating action on the polymer, exposure to low temperatures, or other conditions. The treatment of the present invention relieves such stresses and thus entirely eliminates or greatly reduces the tendency of the bodies to crack under such conditions. The resistance to cracking, impact resistance and toughness of such polymeric bodies are thus improved by the treatment of the invention. Such benefits are obtained without deformation of the bodies. The treatment of the present invention may be applied to bodies entirely or largely formed of polymers of the kind described above and the polymers may be free of or contain up to about 10 per cent of plasticizer; the bodies may in some cases be coated with layers of various materials such as lacquer, or layers of synthetic resins. The polymeric bodies described in the claims are intended to include such bodies.

It is apparent that various other polymers than those indicated above as examples may be beneficially treated according to the invention, that other heating means than the heating oven described above may be employed in the practice of the invention, and that various modifications other than those indicated above may be made in the process of the invention without departing from the spirit of the invention.

It is intended that the patent shall cover by suitable expression in the appended claims whatever features of patentable novelty reside in the invention.

What is claimed is:

1. A method of treating to improve cracking resistance a body of a solid, glassy, essentially amorphous, thermoplastic polymer containing stored stresses which tend to crack the body, comprising slowly heating said body to a substantial depth below its surface to a temperature between about 5° C. and about 20° C. below the transition temperature of said polymer substantially entirely by transfer of heat to said body from a heated gas at a rate at least as slow as that obtained by exposing said body to the gas maintained at an elevated temperature less than about 10° C. above the transition temperature of said polymer, and slowly cooling said heated body to room temperature substantially entirely by transfer of heat from said body to a gas at a rate at least as slow as that obtained by exposing said body to the gas maintained at substantially room temperature.

2. A method of treating to improve cracking resistance a body of a solid, glassy, essentially amorphous, thermoplastic polymer, containing stored stresses which tend to crack the body, comprising slowly heating said body substantially throughout its mass to a temperature between about 5° C. and about 20° C. below the transition temperature of said polymer substantially entirely by transfer of heat to said body from a heated gas at a rate at least as slow as that obtained by exposing said body to the gas maintained at an elevated temperature less than about 10° C. above the transition temperature of said polymer, and slowly cooling said body to room temperature substantially entirely by transfer of heat from said body to a gas at a rate at least as slow as that obtained by exposing said body to the gas maintained at substantially room temperature.

3. A method of treating to improve cracking resistance a body of a solid, glassy, essentially amorphous, thermoplastic synthetic resin containing stored stresses which resulted from molding of the polymerized synthetic resin while it was at an elevated temperature which rendered it plastic and which stresses tend to crack the body, comprising slowly heating said body to a substantially depth below its surface to a temperature between about 5° C. and about 20° C. below the transition temperature of the synthetic resin substantially entirely by transfer of heat to said body from a heated gas at a rate at least as slow as that obtained by exposing said body to the gas maintained at an elevated temperature less than about 10° C. above the transition temperature of said synthetic resin, and slowly cooling said body to room temperature substantially entirely by transfer of heat from said body to a gas at a rate at least as slow as that obtained by exposing said body to the gas maintained at substantially room temperature.

4. A method of treating to improve cracking resistance a body of a solid, glassy, essentially amorphous, thermoplastic synthetic resin containing stored stresses which resulted from molding of the polymerized synthetic resin while it was at an elevated temperature which rendered it plastic and which stresses tend to crack the body, comprising slowly heating said body substantially throughout its mass to a temperature between about 5° C. and about 20° C. below the transition temperature of the synthetic resin substantially entirely by transfer of heat to said body from a heated gas at a rate at least as slow as that obtained by exposing said body to the gas maintained at an elevated temperature less than about 10° C. above the transition temperature of said synthetic resin, and slowly cooling said body to room temperature substantially entirely by transfer of heat from said body to a gas at a rate at least as slow as that obtained by exposing said body to the gas maintained at substantially room temperature.

5. The method of claim 3 in which said synthetic resin is polymethyl methacrylate.

6. The method of claim 3 in which said synthetic resin is polystyrene.

7. The method of claim 3 in which said synthetic resin is a polyvinyl chloride-acetate.

8. The method of treating to improve cracking resistance a body of a solid, glassy, essentially amorphous, thermoplastic organic polymer containing stored stresses which tend to crack the body, comprising slowly heating said body to a substantial depth below its surface to a temperature between about 5° C. and about 20° C. below the transition temperature of said polymer substantially entirely by transfer of heat to said body from a heated gas maintained at an elevated temperature less than about 10° C. above the transition temperature of said polymer, and slowly cooling said body to room temperature substantially entirely by transfer of heat from said body to a gas maintained substantially at room temperature.

9. The method of treating to improve cracking resistance a body of a solid, glassy, essentially amorphous, thermoplastic organic polymer containing stored stresses which tend to crack the body, comprising slowly heating said body substantially throughout its mass to a temperature between about 5° C. and about 20° C. below the transition temperature of said polymer substantially entirely by transfer of heat to said body from a heated gas maintained at an elevated temperature less than about 10° C. above the transition temperature of said polymer, and slowly cooling said body to room temperature substantially entirely by transfer of heat from said body to a gas maintained substantially at room temperature.

10. The method of treating to improve cracking resistance a body of a solid, glassy, essentially amorphous, thermoplastic organic synthetic resin containing stored stresses which tend to crack the body, comprising slowly heating said body to a substantial depth below its surface to a temperature between about 5° C. and about 20° C. below the transition temperature of said synthetic resin substantially entirely by transfer of heat to said body from a heated gas maintained at an elevated temperature less than about 10° C. above the transition temperature of said synthetic resin, and slowly cooling said body to room temperature substantially entirely by transfer of heat from said body to a gas maintained substantially at room temperature.

11. The method of treating to improve cracking resistance a body of a solid, glassy, essentially amorphous, thermoplastic organic synthetic resin containing stored stresses which tend to crack the body, comprising slowly heating said body substantially throughout its mass to a temperature between about 5° C. and about 20° C. below the transition temperature of said synthetic resin substantially entirely by transfer of heat to said body from a heated gas maintained at an elevated temperature less than about 10° C. above the transition temperature of said synthetic resin, and slowly cooling said body to room temperature substantially entirely by transfer of heat from said body to a gas maintained substantially at room temperature.

12. A method of treating to improve cracking resistance a body of solid, glassy, essentially amorphous, thermoplastic organic polymer containing stored stresses which tend to crack said body, which polymer has a transition temperature of approximately 80° C., comprising heating said body between about 1 and 72 hours to a temperature between about 5° C. and about 20° C. below the transition temperature of said polymer substantially entirely by transfer of heat to said body from a gas at an elevated temperature less than 10° C. above said transition temperature, and slowly cooling said body to room temperature substantially entirely by transfer of heat from said body to a gas maintained substantially at room temperature.

13. A method of treating to improve cracking resistance a body of solid, glassy, essentially amorphous, thermoplastic organic synthetic resin containing stored stresses which tend to crack said body, which synthetic resin has a transition temperature of approximately 80° C., comprising heating said body between about 1 and 72 hours to a temperature between about 5° C. and about 20° C. below the transition temperature of said polymer substantially entirely by transfer of heat to said body from a gas at an elevated temperature less than 10° C. above said transition temperature, and slowly cooling said body to room temperature substantially entirely by transfer of heat from said body by a gas maintained substantially at room temperature.

14. The method of claim 13 in which said synthetic resin is polymethyl methacrylate.

15. The method of claim 13 in which said synthetic resin is polystyrene.

16. The method of claim 13 in which said synthetic resin is a polyvinyl chloride-acetate.

17. In the process of forming a body of a solid, glassy, essentially amorphous, thermoplastic organic synthetic resin wherein the polymerized synthetic resin is molded while it is at an elevated temperature which renders it plastic and is then cooled, the improvement which consists in slowly heating the body, after the synthetic resin has been molded and cooled, to a substantial depth below the surface of the body to a temperature between about 5° C. and about 20° C. below the transition temperature of said synthetic resin substantially entirely by transfer of heat to said body from a heated gas at a rate at least as slow as that obtained by exposing said body to the gas maintained at an elevated temperature less than about 10° C. above the transition temperature of said synthetic resin, and slowly cooling said body to room temperature substantially entirely by transfer of heat from said body to a cooler gas at a rate at least as slow as that obtained by exposing said body to the gas maintained at substantially room temperature.

18. In the process of forming a body of a solid, glassy, essentially amorphous, thermoplastic organic synthetic resin wherein the polymerized synthetic resin is molded while it is at an elevated temperature above its melting point and is then cooled, the improvement which consists in slowly heating the body, after the synthetic resin has been molded and cooled, substantially throughout the mass of the body to a temperature between about 5° C. and about 20° C. below the transition temperature of said synthetic resin substantially entirely by transfer of heat to said body from a heated gas at a rate at least as slow as that obtained by exposing said body to the gas maintained at an elevated temperature less than about 10° C. above the transition temperature of said synthetic resin, and slowly cooling said body to room temperature substantially entirely by transfer of heat from said body to a cooler gas at a rate at least as slow as that obtained by exposing said body to the gas maintained at substantially room temperature.

WILLIAM O. BAKER.